United States Patent
David et al.

(10) Patent No.: US 11,852,269 B2
(45) Date of Patent: Dec. 26, 2023

(54) DEVICE FOR CONNECTING TUBULAR ELEMENTS

(71) Applicant: A. RAYMOND ET CIE, Grenoble (FR)

(72) Inventors: Matthieu David, Seyssinet Pariset (FR); Olivier Bizzini, Quaix-en-char-treuse (FR); Sébastien Hamitouche, Vinay (FR)

(73) Assignee: A. RAYMOND ET CIE, Grenoble (FR)

( * ) Notice: Subject to any disclaimer, the term of this patent is extended or adjusted under 35 U.S.C. 154(b) by 64 days.

(21) Appl. No.: 17/272,185

(22) PCT Filed: Aug. 14, 2019

(86) PCT No.: PCT/FR2019/051925
§ 371 (c)(1),
(2) Date: Feb. 26, 2021

(87) PCT Pub. No.: WO2020/043975
PCT Pub. Date: Mar. 5, 2020

(65) Prior Publication Data
US 2021/0317929 A1  Oct. 14, 2021

(30) Foreign Application Priority Data

Aug. 29, 2018 (FR) ...................................... 1857760

(51) Int. Cl.
*F16L 3/237* (2006.01)
*F16B 7/04* (2006.01)
(52) U.S. Cl.
CPC ............ *F16L 3/237* (2013.01); *F16B 7/0433* (2013.01); *F16B 7/0493* (2013.01)

(58) Field of Classification Search
CPC .... F16B 7/0493; F16B 7/0433; F16B 7/0486; F16L 3/237; F16L 3/10; F16L 3/1025;
(Continued)

(56) References Cited

U.S. PATENT DOCUMENTS 331,712 A * 12/1885 Huckins ................ F16C 33/201
   403/384
1,740,740 A  12/1929 Little
(Continued)

FOREIGN PATENT DOCUMENTS

DE   3320385 A1   12/1984
DE   4206402 A1    6/1993
(Continued)

OTHER PUBLICATIONS

International Search Report for International Application No. PCT/FR2019/051925, dated Dec. 2, 2019, 02 pages.
(Continued)

*Primary Examiner* — Ingrid M Weinhold
(74) *Attorney, Agent, or Firm* — TraskBritt

(57) ABSTRACT

A device for connecting tubular elements, comprises a first body provided with a first reception housing for accommodating a longitudinal portion of a first tubular element and provided with a first connection component; a second body provided with a second reception housing for accommodating a longitudinal portion of a second tubular element and provided with a second connection component, the second body being formed by two half-shells each comprising a portion of the second housing and a portion of the second connection component; the first and the second connection component being configured to keep the first and second bodies assembled, while allowing a rotation movement between them along a transverse axis. The first and second body, respectively, have a first and a second face with a
(Continued)

circular profile, the first and second connection component respectively, being disposed on the periphery of the first and second face with a circular profile.

18 Claims, 3 Drawing Sheets

(58) Field of Classification Search
CPC .............. F16L 3/1066; Y10T 403/7129; Y10T 403/32975; G09F 2007/1813; F21V 21/116; G08G 1/095
USPC .................. 248/62, 68.1, 74.4; 403/384, 164
See application file for complete search history.

(56) References Cited

U.S. PATENT DOCUMENTS

| | | | |
|---|---|---|---|
| 2,676,044 A | | 4/1954 | Gorman et al. |
| 4,037,978 A | | 7/1977 | Connelly |
| 4,039,263 A | | 8/1977 | Bassler |
| 4,799,444 A | * | 1/1989 | Lisowski .................. F16B 2/06 |
| | | | 114/221 R |
| 4,817,897 A | * | 4/1989 | Kreusel ..................... F16B 7/04 |
| | | | 248/74.1 |
| 4,915,535 A | * | 4/1990 | Willetts .................. F16B 7/044 |
| | | | 403/191 |
| 7,241,071 B2 | * | 7/2007 | Carraher ................. E04C 5/163 |
| | | | 52/719 |
| 8,083,432 B2 | | 12/2011 | Limpert |
| 8,960,613 B2 | | 2/2015 | White |
| 9,074,706 B2 | * | 7/2015 | Rolf ......................... F16L 1/207 |
| 9,574,384 B1 | * | 2/2017 | Reischmann ........... E05D 11/10 |
| 10,352,343 B2 | * | 7/2019 | Milner ................ E04F 11/1817 |
| 2002/0037193 A1 | | 3/2002 | Gibbons et al. |
| 2005/0217198 A1 | * | 10/2005 | Carraher ................. E04C 5/167 |
| | | | 52/719 |
| 2006/0038094 A1 | * | 2/2006 | Simmons .............. F16B 7/0486 |
| | | | 248/188 |
| 2015/0030388 A1 | | 1/2015 | Fujii et al. |
| 2018/0023757 A1 | * | 1/2018 | Baiera ..................... F16L 3/006 |
| | | | 248/513 |

FOREIGN PATENT DOCUMENTS

| | | |
|---|---|---|
| EP | 0590806 A2 | 4/1994 |
| EP | 0509015 A1 * | 7/1996 |
| EP | 0964107 A1 | 12/1999 |
| EP | 3239538 A1 | 11/2017 |
| FR | 2282566 A1 | 3/1976 |
| FR | 2986052 A1 | 7/2013 |
| GB | 2119848 A | 11/1983 |
| JP | 2001-245425 A | 9/2001 |
| WO | 2005113914 A1 | 12/2005 |
| WO | 2016/081973 A1 | 6/2016 |

OTHER PUBLICATIONS

International Written Opinion for International Application No. PCT/FR2019/051925, dated Dec. 2, 2019, 12 pages.

* cited by examiner

DEVICE FOR CONNECTING TUBULAR ELEMENTS

CROSS-REFERENCE TO RELATED APPLICATIONS

This application is a national phase entry under 35 U.S.C. § 371 of International Patent Application PCT/FR2019/051925, filed Aug. 14, 2019, designating the United States of America and published as International Patent Publication WO 2020/043975 A1 on Mar. 5, 2020, which claims the benefit under Article 8 of the Patent Cooperation Treaty to French Patent Application Serial No. 1857760, filed Aug. 29, 2018.

TECHNICAL FIELD

The present disclosure relates to a device for connecting tubular elements. It finds its application, in particular, in the field of 3D tubular structures, in order to assemble and attach tubular elements to one another and produce a structure with a predetermined shape.

BACKGROUND

Forming a 3D tubular structure requires the use of connection devices in order to assemble the tubular elements constituting the structure.

Such connection devices are known from EP0964107 and US2015030388. The connection devices of these documents include an assembly nut formed by two parts, between which the ends of the tubular elements to be assembled are arranged. Such a connection device has the advantage of having a reduced center distance between the tubular elements. However, this type of device does not allow any modification of the orientation of the tubular elements relative to one another because they are kept fixedly in a position and an orientation fixed by the geometry of the connection device. Such a rotation movement may be preferable if it is desired to be able to produce tubular structures with various shapes.

GB2119848, EP0590806, U.S. Pat. Nos. 8,083,432, 8,960,613, EP1751369, FR2986052, US2002037193, WO2016081973 and DE3320385 propose solutions addressing the problem of the lack of mobility of the assembled tubular elements. The devices disclosed by these documents are generally formed by two parts, each part making it possible to attach a tubular element, the two parts being mounted so as to be rotatable with respect to one another. These devices thus allow the rotation of the tubular elements with respect to one another via the relative movement of the two parts of the connection device. However, their structure is complex and their assembly requires the use of a tool.

French Patent No. 2,282,566 discloses a simple connection device allowing the rotation of the tubular elements with respect to one another. However, in this connection device, the center distance between the tubular elements is relatively large, which is a drawback for certain types of structures in which a reduced center distance is preferable.

BRIEF SUMMARY

One aim of the present disclosure is that of providing a device for connecting tubular elements, which addresses all or part of the drawbacks of the prior art. It aims in particular to provide a simple connection device, which allows the rotation of the tubular elements relative to one another and which makes it possible to have a reduced, or even minimal, center distance between the tubular elements.

With a view to achieving this aim, the object of the present disclosure is that of providing a device for connecting tubular elements, comprising a first body provided with a first reception housing for accommodating a longitudinal portion of a first tubular element and provided with a first connection component; a second body provided with a second reception housing for accommodating a longitudinal portion of a second tubular element and provided with a second connection component, the second body being formed by two half-shells each comprising a portion of the second housing and a portion of the second connection component. The first and the second connection component are configured in order to keep the first and the second bodies assembled, while allowing a rotation movement between them along a transverse axis.

According to the present disclosure, the first body and the second body, respectively, have a first and a second face with a circular profile, the first and the second connection component, respectively, being disposed on the periphery of the first and of the second face with a circular profile.

According to other advantageous and non-limiting features of the present disclosure, taken alone or in any technically practicable combination:

- the first housing and the second housing, respectively, open out on the first and the second face with a circular profile to form a single housing when the first body and the second body are assembled;
- the first connection component and the second connection component comprise an annular groove and an annular rib, the groove and the rib being configured to engage with one another;
- each half-shell comprises one half of the second housing;
- the two half-shells are each provided with complementary guide means, making it possible to position the half-shells relative to one another;
- the guide means comprise at least one stud arranged on one of the half-shells facing at least one hole arranged on the other half-shell;
- the two half-shells are each provided with attaching means for securing the two half-shells;
- the attaching means comprise at least one notch arranged on one of the half-shells facing at least one cavity arranged on the other half-shell;
- the attaching means comprise at least one assembly screw, at least one first borehole arranged on one of the half-shells and at least one second borehole arranged on the other half-shell;
- the first and the second borehole are each supported by a lug formed on each of the half-shells;
- the first housing and/or the second housing comprises at least one stop intended to engage with at least one spacer supported by the first tubular element and/or the second tubular element.

BRIEF DESCRIPTION OF THE DRAWINGS

Further features and advantages of the present disclosure will become apparent from the following detailed description of example embodiments of the present disclosure, with reference to the accompanying figures, in which.

DETAILED DESCRIPTION

In order to simplify the following description, the same reference signs are used for identical elements or for elements performing the same function. The figures are schematic representations, which, for the sake of readability, are not to scale.

General Description of the Connection Device

Figure 1A:
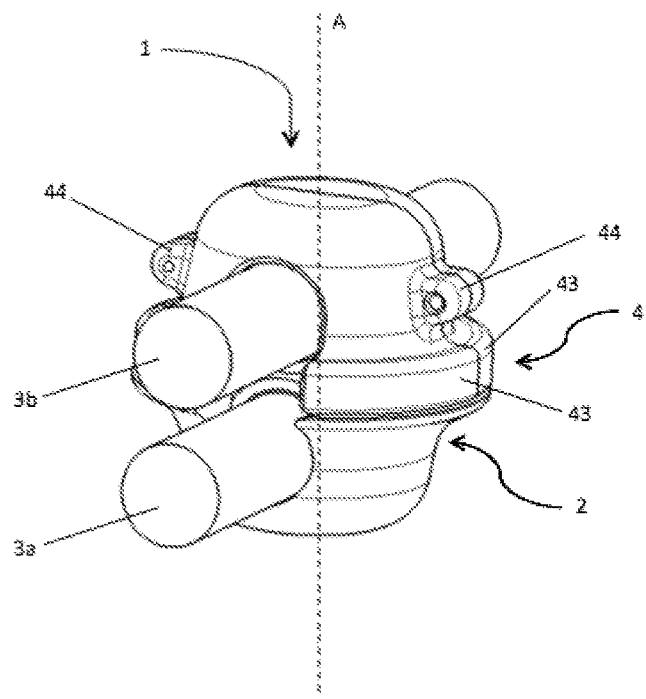
FIG. 1A shows an overall view of a device for connecting tubular elements according to the present disclosure.
Figure 1B:
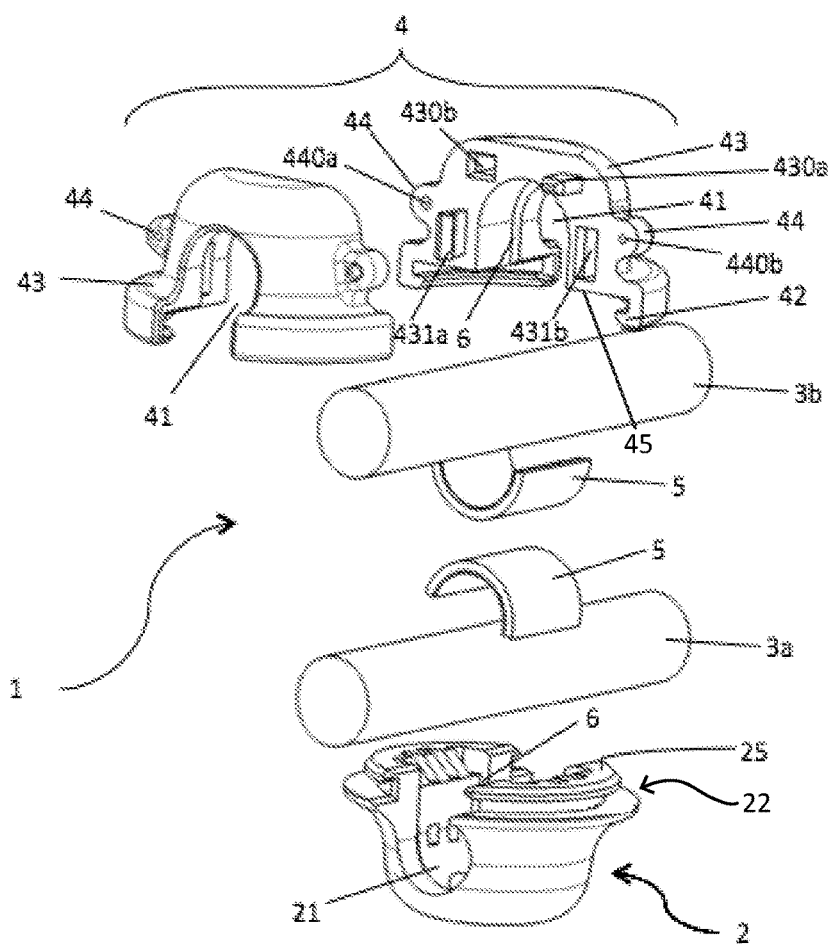
FIG. 1B shows an exploded view of a device for connecting tubular elements according to the present disclosure.

FIG. 1A shows an overall view of the connection device 1 according to the present disclosure and FIG. 1B shows an exploded overall view of the connection device 1.

The device 1 for connecting tubular elements is composed of a first body 2 intended to receive a first tubular element 3a, and of a second body 4 formed by two half-shells 43 and intended to receive a second tubular element 3b. The first body 2 and the second body 4 are assembled so as to be able to rotate with respect to one another along a transverse axis A. This transverse axis A passes through the center of the first and of the second bodies 2, 4 and is normal to the plane formed by the region of contact between the first and the second bodies 2, 4.

The device 1 aims to keep the first tubular element 3a and the second tubular element 3b fixedly together, while allowing a rotation movement of one relative to the other. This movement is obtained by the rotation of the first body 2 and/or second body 4, which receive, respectively, the first tubular element 3a and the second tubular element 3b.

The tubular elements 3a, 3b can be very different types. They can thus have a hollow body, and correspond to pipes or tubes, or have a solid body, and correspond to rods. They can have portions of circular, rectangular, triangular or other shapes. The tubular elements 3a, 3b can also be made of various materials, such as plastics material or metal. They are not necessarily all identical.

Advantageously, the materials of the first tubular element 3a and of the second tubular element 3b are thermoplastics materials, which have important mechanical characteristics in terms of resistance. The material used can also contain additives such as glass fibers to strengthen it mechanically. The tubular elements 3a, 3b need not necessarily be made of the same material.

Also advantageously, the first body 2 and/or second body 4 can include, on their outer surface, cavities of various shapes in order to reduce the amount of material used without impacting the function of the bodies.

Description of the Connection Device

The first body 2 is provided with a first reception housing 21 and a first connection component 22. The first housing 21 crosses completely, right through, the first body 2 along a first longitudinal axis in order to accommodate a longitudinal portion of the first tubular element 3a. The first housing 21 has a shape and a diameter adapted to the first tubular element 3a, which it accommodates.

The second body 4 is provided with a second reception housing 41 and a second connection component 42. Similarly to the first housing 21, the second housing 41 crosses completely, right through, the second body 4 along a second longitudinal axis in order to accommodate a longitudinal portion of the second tubular element 3b and has a shape and a diameter adapted to the second tubular element 3b.

Figure 2:
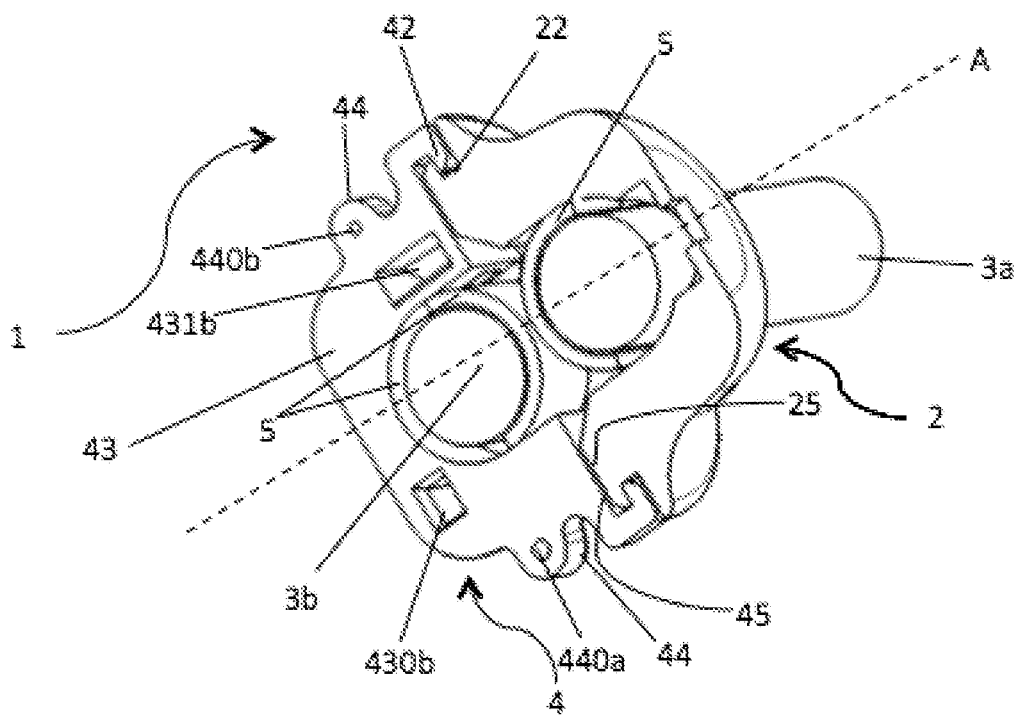
FIG. 2 shows a sectional view of the device for connecting tubular elements according to the present disclosure.
Figure 5:
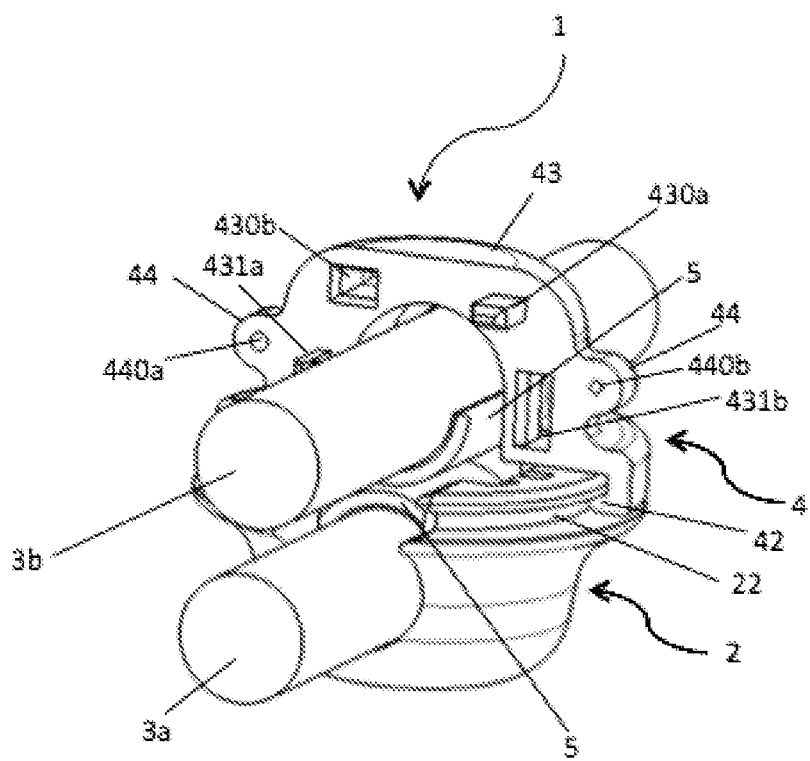
FIG. 5 shows the assembly of a half-shell to the first body in the presence of the first and second tubular element.

The first connection component 22 and the second connection component 42 are configured in order to keep the first body 2 and the second body 4 assembled, while allowing a rotation movement between them along the transverse axis A. As can be seen in FIGS. 1A, 2 and 5, the first longitudinal axis and the second longitudinal axis are in planes, which are parallel to one another and perpendicular to the transverse axis A. The attaching device therefore makes it possible to assemble the tubular elements 3a, 3b in the parallel planes and orient them with respect to one another.

Figure 3:
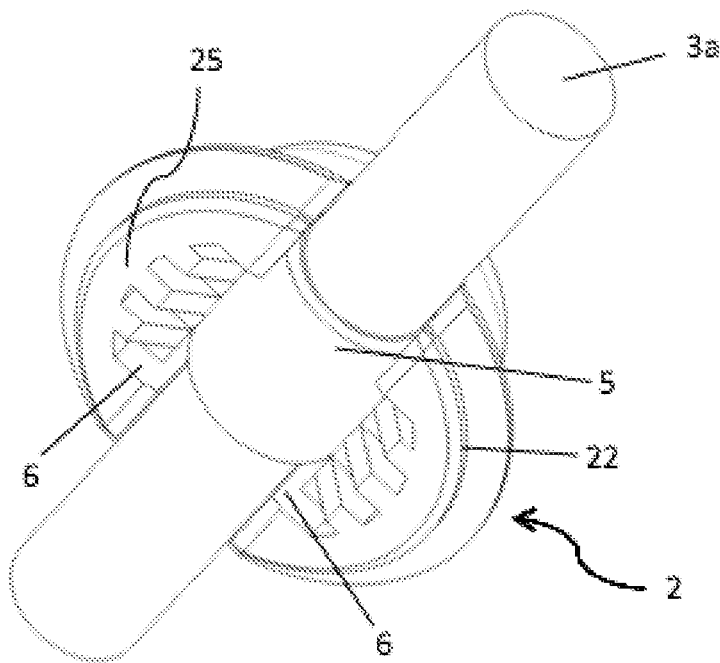
FIG. 3 shows the assembly of the first tubular element with the first body.
Figure 4:
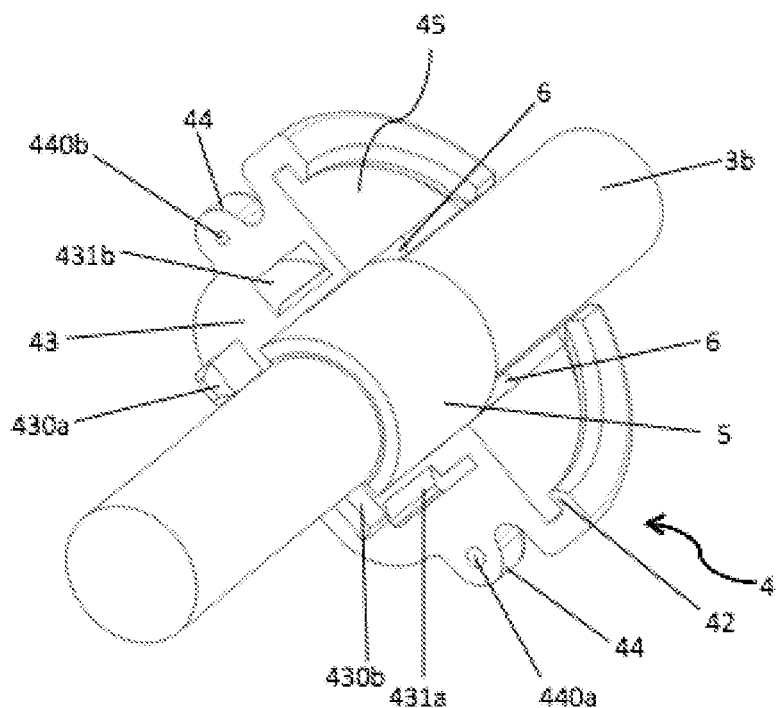
FIG. 4 shows the assembly of the second tubular element with a half-shell.

The first body 2 and the second body 4 have, respectively, a first face 25 and a second face 45, the profiles of which are circular, as can be seen in FIGS. 3 and 4, respectively. The first face 25 and the second face 45 correspond to the contact surfaces between the first body 2 and the second body 4 when they are assembled.

Advantageously, the first housing 21 and the second housing 41, respectively, open out onto the first face 25 and the second face 45. The first face 25 and second face 45 are thus each made up of two distinct parts, as is clearly visible in FIGS. 3 and 4. When the first body 2 and the second body 4 are assembled, the two housings 21, 41 are matched to form a single housing. This unique housing has the advantage of reducing the distance separating the first tubular element 3a from the second tubular element 3b, and therefore has a reduced or even minimal center distance (i.e., bringing the first and the second tubular element into contact, while preserving sufficient functional play).

In the example shown in the figures, the second connection component 42 is disposed on the periphery of the second face 45. The expression "on the periphery" is understood to mean "on the edge" of the circular faces. The first connection component 22 is disposed below the first face 25 at the periphery of the first body 2. Advantageously, as shown in FIGS. 1 to 5, the connection components 22 and 42 extend along the entire periphery of the first body 2 and the second body 4 outside the regions occupied by the housings 21 and 41. They could alternatively extend along only part of the periphery of the first face 25 and of the second face 45 so as not to hinder the rotation between the first body 2 and the second body 4.

Advantageously, the first connection component 22 comprises at least one annular groove and the second connection component 42 comprises at least one annular rib, the groove and the rib being configured to engage with one another. Provision could naturally be made for the first connection component 22 to comprise an annular rib, and for the second connection component to comprise an annular groove. Other types of connection, rather than a rib and a groove, are also possible.

Preferably, the annular groove 22 is located on the outer surface of the first body 2 and oriented toward the outside of the device 1. Similarly, the annular rib 42 is also arranged on the outer surface of the second body 4.

Advantageously, and as is clearly visible in the sectional view along a transverse plane of FIG. 2, the annular rib 42 may form part of a groove 22 formed on the periphery of the second face 45 with a circular profile and be oriented inwardly so as to be able to engage with the annular groove 22 of the first body 2.

The two half-shells 43, forming the second body 4, each comprise a portion of the second housing 41 and a portion of the second connection component 42. They are formed so that each one constitutes one half of the second body 4. More specifically, each half-shell 43 comprises a portion of the second housing 41 located, respectively, on either side of a plane normal to the second face 45 and passing through the second longitudinal axis.

In order to facilitate their assembly, the half-shells 43 may be provided with complementary guide means, making it possible to position them relative to one another. The half-shells 43 can also be provided with attaching means.

Advantageously, the guide means comprise at least one stud 430a arranged on one of the half-shells 43 facing at least one hole 430b arranged on the other half-shell 43. Each half-shell 43 can be provided with a plurality of guide means, as shown in FIGS. 1B and 2. Thus each half-shell 43 can include a stud 430a and a hole 430b facing, respectively, a hole 430b and a stud 430a arranged on the other half-shell 43. Of course, other configurations are possible and the number and distribution of the studs 430a and of the holes 430b between the two half-shells 43 are of no particular importance.

Alternatively, in particular, in the case where the outer surface of the first body 2 and/or second body 4 is provided with cavities, the guide means of each half-shell 43 comprise a pair of notches and a pair of openings, each with a stop to accommodate a notch. Advantageously, the notches of the same pair are not oriented in the same direction. In the case where the surface of the first body 2 and/or second body 4 comprises cavities, the pair of openings can be formed on the bottom of cavities, these cavities then opening onto the inside of the half-shell 43. During assembly of the two half-shells 43, each notch passes through and clips onto the stop of the associated opening thus ensuring the attachment of the two half-shells 43. In this case, the guide means also perform the attaching function, and therefore all or part of the attaching means described below may be absent from the connection device.

Advantageously, the attaching means comprise at least one notch 431a arranged on one of the half-shells 43 facing at least one cavity 431b arranged on the other half-shell 43. Similarly to the guide means, each half-shell 43 can be provided with a plurality of attaching means, as shown in FIGS. 1B and 2. Thus each half-shell 43 may include a notch 431a and a cavity 431b facing, respectively, a cavity 431b and a notch 431a arranged on the other half-shell 43. Of course, other configurations are possible and the number and distribution of the notches 431a and of the cavities 431b between the two half-shells 43 are of no particular importance.

Advantageously, the attaching means may comprise, alternatively or in addition to the notch(es) 431a and cavity/ies 431b, at least one assembly screw (not shown in the figures). To facilitate the insertion of the screw, a first borehole 440a may be arranged on one of the half-shells 43 and a second borehole 440b may be arranged, facing it, on the other half-shell 43. The first borehole 440a may have a larger diameter than that of the second borehole 440b. The first borehole 440a may have a diameter greater than or equal to that of the screw. The second borehole 440b may have a diameter smaller than that of the screw to allow its threading when attaching the screw.

Advantageously, the first borehole 440a and the second borehole 440b are each supported by a lug 44 arranged correspondingly on each of the half-shells 43. Advantageously, each half-shell 43 comprises two lugs 44 on the outer surface thereof and diametrically opposite one another, as can be seen in FIGS. 1A, 1B and 2.

To prevent the tubular elements 3a, 3b from sliding out of the housings 21, 41, the attaching device 1 can be provided with at least one spacer 5. This spacer 5 can be arranged on a part of the longitudinal portion of the tubular element 3a, 3b intended to be placed in the housing 21, 41. The spacer leads to locally increasing the diameter of the tubular element 3a, 3b so as to engage with at least one stop 6 of the housing 21, 41. Advantageously, the housing 21, 41 comprises two stops 6, between which the portion of the tubular element supporting the spacer is placed so as to block or limit the longitudinal translational movement of the tubular element 3a, 3b in the connection device 1.

A spacer 5 may have been placed in a predetermined location of the first and of the second tubular element 3a, 3b, prior to attaching the connection device. It is thus possible to position the connection device 1 at this predetermined location of the first and of the second tubular element 3a, 3b.

The spacer 5 can be assembled on the first and on the second tubular element 3a, 3b by gluing, by welding or by any other known technique. The spacer can be made of a plastics material or metal. The spacer 5 may extend longitudinally over the entire portion of the tubular element 3a, 3b intended to be placed in the housing 21, 41, or over only a part of this portion.

The spacer 5 may consist of a ring to be fitted onto the tubular element 3a, 3b. It may also be a portion of a ring, such as a half-ring as shown in the figures. This configuration can be of interest because it makes it possible to limit the rotation of the tubular element 3a, 3b in the housing 21, 41, the ends of the portion of the ring being able to come into contact with complementary stops or the walls of housing 21, 41.

Implementation of the Connection Device

In a first step, shown in FIG. 3, the first tubular element 3a is assembled on the first body 2. A longitudinal portion of the first tubular element 3a is placed in the first housing 21.

In a second step, shown in FIG. 4, the second tubular element 3b is similarly assembled on a half-shell 43. A longitudinal portion of the second tubular element 3b is placed in the part of the second housing 41 included in the half-shell 43.

In a third step, shown in FIG. 5, the half-shell 43 equipped with the second tubular element 3b is assembled on the first body 2 provided with the first tubular element 3a by inserting the rib 42 of the half-shell 43 into the groove 22 of the first body 2. This can be achieved, for example, by aligning the first face 25 with a circular profile and the second face 45 with a circular profile supported by the half-shell 43 in the same plane, then by translating the half-shell 43 and the first body 2 toward one another to make the groove 22 engage with the rib 42.

In a fourth and final step, shown in FIG. 1A, the remaining half-shell 43 (not equipped with the second tubular element 3b) is assembled on the other half-shell 43 by making the rib 42 supported by the remaining half-shell 43 coincide with groove 22. The two half-shells 43 are correctly aligned with one another due to guiding the rib 42 into the groove 22 but also due to the guide elements arranged on each half-shell 43. To ensure the assembly of the two half-shells 43, a pressure along the second longitudinal axis is effected on the surface of the two half-shells 43 so as to lock the attaching means. The assembly screw, when provided, is then inserted through the first borehole 440a and screwed into the second borehole 440b.

The present disclosure thus has the advantage of having a simple assembly, which does not require applying significant assembly forces or necessarily the use of a tool. The tubular elements are nevertheless kept firmly. Furthermore, due to the connection components 22 and 42, the first and the second tubular element 3a, 3b can rotate relative to one another about transverse axis A. The connection device according to the present disclosure may have a reduced, or even minimal, center distance due to the presence of a single housing composed of the first housing 21 and second housing 41, while allowing the tubular elements to be brought into contact.

As will be readily understood, the present disclosure is not limited to the described embodiment, and it is possible to add variants thereto without departing from the scope of the invention as defined by the claims.

In particular, the term "tubular element" denotes, in the context of the present disclosure, any element of elongate shape, capable of forming an element of a structure. This element can be solid or hollow, and have a portion of any shape.

The invention claimed is:

1. A device for connecting tubular elements, comprising:
a first body having a first reception housing, the first body being delimited, on a first face of said first body, by an edge having a partially circular profile, the first reception housing being configured for accommodating a longitudinal portion of a first tubular element in a first plane parallel to the first face, the first body being further provided with a first connection component; and
a second body having a second reception housing, the second body being delimited, on a second face of said second body, by an edge having a partially circular profile, the second reception housing being configured for accommodating a longitudinal portion of a second tubular element in a second plane parallel to the first plane and different from said first plane, the second body being further provided with a second connection component, the second body being formed by two half-shells each comprising a portion of the second reception housing and a portion of the second connection component, the first and the second connection component being configured to keep the first and the second bodies assembled, while allowing a rotation movement between them about a transverse axis normal to the first face and the second face;
wherein the first face and the second face respectively open into the first and second reception housings, each of the first and second reception housings being substantially U-shaped, so that when the first and second bodies are assembled, the faces contact one another with the first and second reception housings opposing one another and forming a single continuous elongated space; and
wherein the first and the second connection component, respectively, are disposed adjacent to the first and the second face, and each of the first and the second connection component have a partially circular profile.

2. The device of claim 1, wherein one of the first connection component and the second connection component comprises an annular groove, while the other of the first connection component and the second connection component comprises an annular rib, the groove and the rib being configured to engage with one another.

3. The device of claim 2, wherein each half-shell comprises one half of the second reception housing.

4. The device of claim 3, wherein the two half-shells are each provided with complementary guide means for enabling positioning of the half-shells relative to one another.

5. The device of claim 4, wherein the guide means comprise at least one stud arranged on one of the half-shells facing at least one hole arranged on the other half-shell.

6. The device of claim 4, wherein the two half-shells are each provided with attaching means for securing the two half-shells.

7. The device of claim 6, wherein the attaching means comprise at least one protuberance arranged on one of the half-shells facing at least one cavity arranged on the other half-shell.

8. The device of claim 6, wherein the attaching means comprise at least one assembly screw, at least one first borehole arranged on one of the half-shells and at least one second borehole arranged on the other half-shell.

9. The device of claim 8, wherein the first and the second borehole are each supported by a lug formed on each of the half-shells.

10. The device of claim 6, wherein the first reception housing and/or the second reception housing comprises at least one stop configured to engage with at least one spacer supported by the first tubular element and/or the second tubular element.

11. The device of claim 1, wherein each half-shell comprises one half of the second reception housing.

12. The device of claim 1, wherein the two half-shells are each provided with complementary guide means for enabling positioning of the half-shells relative to one another.

13. The device of claim 12, wherein the guide means comprise at least one stud arranged on one of the half-shells facing at least one hole arranged on the other half-shell.

14. The device of claim 1, wherein the two half-shells are each provided with attaching means for securing the two half-shells.

15. The device of claim 14, wherein the attaching means comprise at least one protuberance arranged on one of the half-shells facing at least one cavity arranged on the other half-shell.

16. The device of claim 14, wherein the attaching means comprise at least one assembly screw, at least one first borehole arranged on one of the half-shells and at least one second borehole arranged on the other half-shell.

17. The device of claim 16, wherein the first and the second borehole are each supported by a lug formed on each of the half-shells.

18. The device of claim 1, wherein the first reception housing and/or the second reception housing comprises at least one stop configured to engage with at least one spacer supported by the first tubular element and/or the second tubular element.

* * * * *